(12) United States Patent
Yang et al.

(10) Patent No.: US 9,778,406 B2
(45) Date of Patent: Oct. 3, 2017

(54) BUTTON MODULE

(71) Applicant: SHENZHEN ROYOLE TECHNOLOGIES CO. LTD., Shenzhen (CN)

(72) Inventors: Songling Yang, Shenzhen (CN); Songya Chen, Shenzhen (CN); Zihong Liu, Shenzhen (CN)

(73) Assignee: SHENZHEN ROYOLE TECHNOLOGIES CO., LTD., Shenzhen (CN)

( * ) Notice: Subject to any disclaimer, the term of this patent is extended or adjusted under 35 U.S.C. 154(b) by 16 days.

(21) Appl. No.: 15/058,762

(22) Filed: Mar. 2, 2016

(65) Prior Publication Data
US 2016/0377789 A1 Dec. 29, 2016

Related U.S. Application Data

(63) Continuation of application No. PCT/CN2015/082022, filed on Jun. 23, 2015.

(51) Int. Cl.
*F21V 7/04* (2006.01)
*F21V 8/00* (2006.01)
(Continued)

(52) U.S. Cl.
CPC ......... *G02B 6/0021* (2013.01); *G02B 6/0045* (2013.01); *G02B 6/0066* (2013.01);
(Continued)

(58) Field of Classification Search
CPC .. G02B 6/0021; G02B 6/0045; G02B 6/0066; G06F 3/03547; G06F 3/0362
(Continued)

(56) References Cited

U.S. PATENT DOCUMENTS

| 7,918,573 B2* | 4/2011 | Fujiwara | G02B 6/0001 362/23.09 |
| 8,998,451 B2* | 4/2015 | Crognale | G09F 3/20 362/249.16 |

FOREIGN PATENT DOCUMENTS

| CN | 201413782 Y | 2/2010 |
| CN | 201509230 U | 6/2010 |
| TW | 200501871 A | 1/2005 |

OTHER PUBLICATIONS

International Search Report and Written Opinion, PCT/CN2015/082022, Mar. 25, 2016, 9 pgs.

\* cited by examiner

*Primary Examiner* — Seung Lee
(74) *Attorney, Agent, or Firm* — Morgan, Lewis & Bockius LLP

(57) ABSTRACT

A button module includes an operating member, a circuit board having a pattern for detecting touch operations on the operating member, a button arranged on the circuit board, and a light guiding component further including a front side, a back side opposite to the front side, a housing defined between the front and back sides, a recess defined in the back side for hosting a light source, a through hole extending through the front side and connecting the housing to the external space, and an optical path from an inner surface of the recess to the front side. The operating member, the circuit board and the button are located in the housing with the operating member at least partially hosted in the through hole and the button abutting the light guiding component. Light from the light source located in the recess extends along the optical path to the front side.

20 Claims, 4 Drawing Sheets

(51) Int. Cl.
*G06F 3/0362* (2013.01)
*G06F 3/0354* (2013.01)
*G06F 3/02* (2006.01)

(52) U.S. Cl.
CPC .......... *G06F 3/0202* (2013.01); *G06F 3/0362* (2013.01); *G06F 3/03547* (2013.01)

(58) Field of Classification Search
USPC ................................................ 362/611, 612
See application file for complete search history.

BUTTON MODULE

RELATED APPLICATION

This application is a continuation application of PCT Patent Application No. PCT/CN2015/082022, entitled "BUTTON MODULE" filed on Jun. 23, 2015, which is incorporated by reference in its entirety.

TECHNICAL FIELD

The disclosure relates to buttons, and particularly relates to a button module having a light emitting effect.

BACKGROUND

As designs are increasingly attractive to consumers, designs for buttons are becoming more and more diversified. One of them is a button having a light emitting effect. The conventional light-emitting button includes a light guiding board and multiple LED lights with the LED lights evenly distributed along the edges of the light guiding board to achieve an evenly light emitting effect on both sides of the light guiding board. One problem with such design is that it requires multiple LED lights and is not energy efficient.

SUMMARY

The disclosure provides a button module which needs less light sources.

One embodiment of the present disclosure provides a button module including an operating member, a circuit board having a pattern for detecting touch operations on the operating member, a button arranged on the circuit board, and a light guiding component including a front side, a back side opposite to the front side, a housing defined between the front side and the back side, a recess defined in the back side, a through hole extending through the front side and connecting the housing to the external space, and an optical path extending from an inner surface of the recess to the front side. The operating member, the circuit board and the button are located in the housing in sequence, the operating member is at least partially hosted in the through hole, and the button abuts the light guiding component.

Another embodiment of the present disclosure provides a button module including a light guiding base, in which a recess is defined, a light guiding cover located opposite to the light guiding base and defining a through hole and a light emitting ring surface surrounding the through hole, an operating member, which is at least partially hosted in the through hole, and a button, which is connected to the operating member and abuts the light guiding base. The light guiding base and the light guiding cover define an optical path extending from an inner surface of the recess to the light emitting ring surface, and an interior diameter of the optical path is greater than an exterior diameter of the light emitting ring surface.

In the present disclosure, light emitted from a light source located in the recess would extend along the optical path defined by the light guiding component from the inner surface of the recess to the front side and the external space. Thus, the embodiment of the present disclosure provides a button module just requires one light source, and avoids using a number of the light sources.

BRIEF DESCRIPTION OF THE DRAWINGS

The following drawings with the detailed description are used to clearly illustrate the embodiments of the present disclosure. It can be understood that, the components in the drawings are not necessarily drawn to size and scale, the emphasis instead being placed upon clearly illustrating the principles of the present embodiments, and should not be considered as limitations.

DETAILED DESCRIPTION

Figure 1:
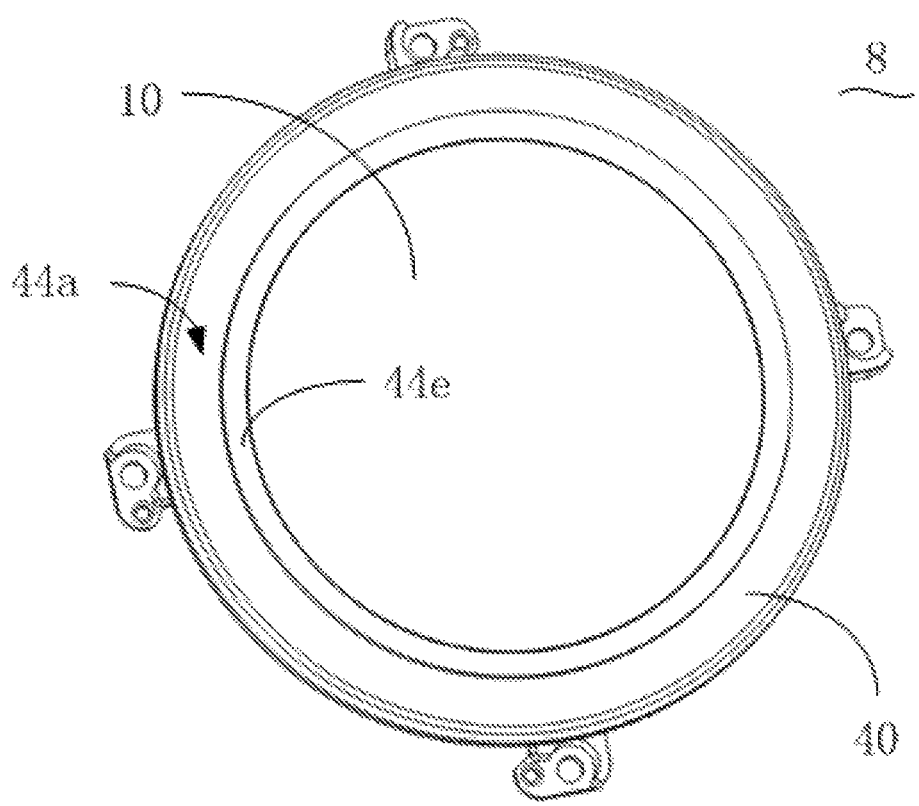
FIG. 1 is a schematic view of a button module in accordance with a first embodiment of the present disclosure.
Figure 2:
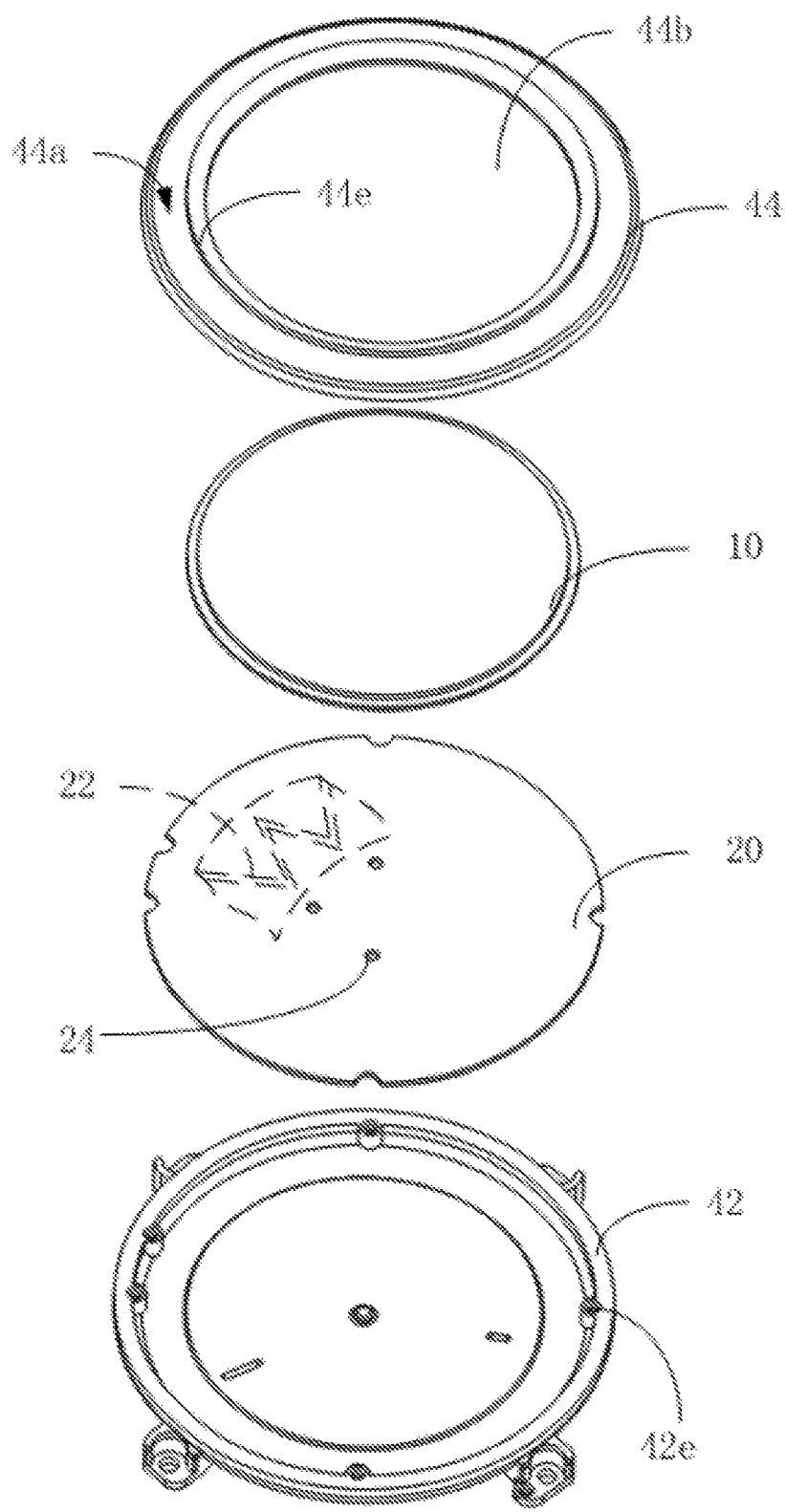
FIG. 2 is a partially exploded view of the button module in FIG. 1 taken from a top direction.
Figure 3:
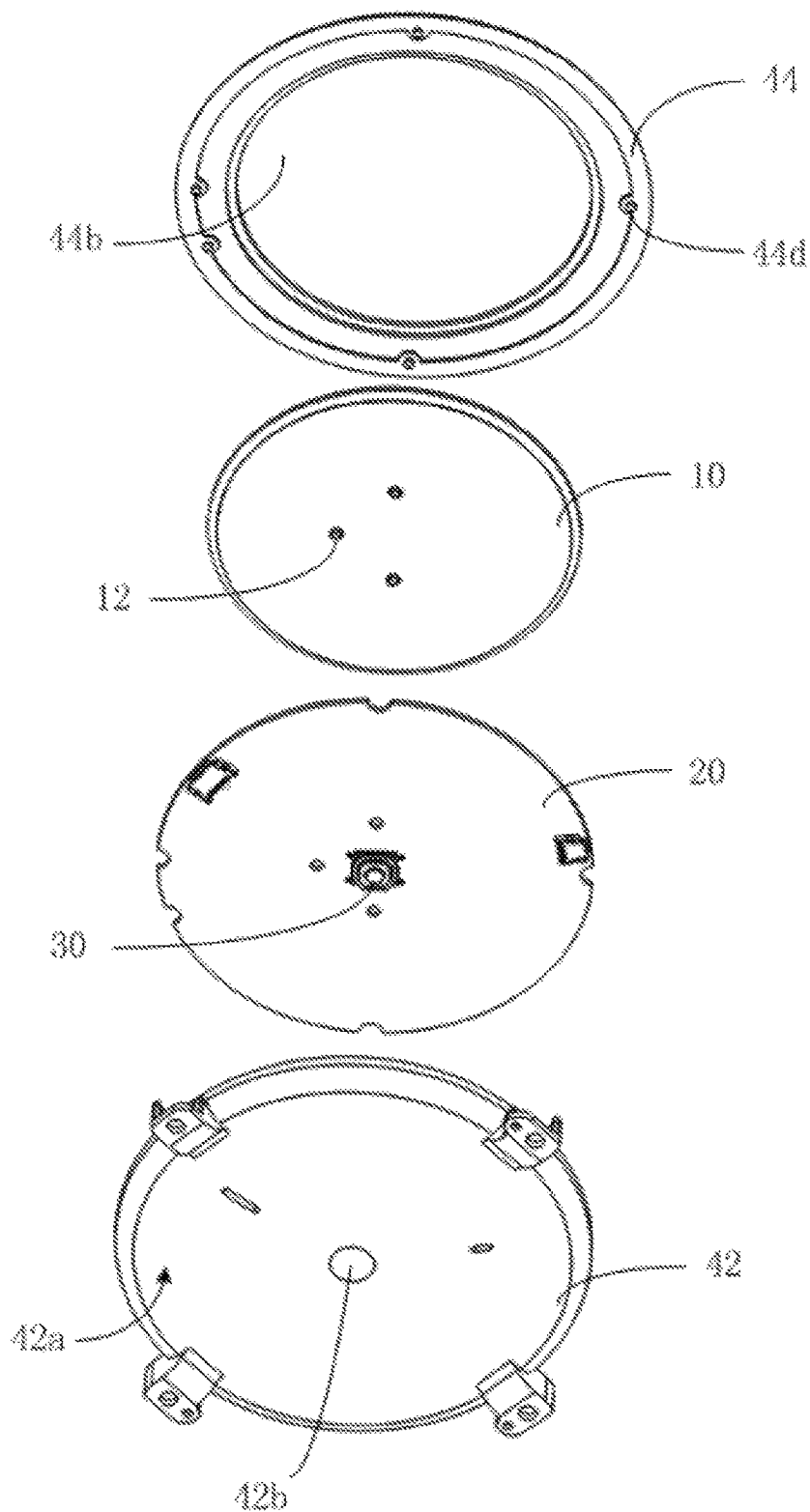
FIG. 3 is a partially exploded view of the button module in FIG. 1 taken from a bottom direction.

In order to more clearly present purpose, technology program and advantages of the present invention, the following combining a plurality of embodiments and the drawings further illustrates the present invention. It should be understood that, the following described specific implementation ways are only used for explaining the present invention, not limiting the present invention.

Referring to FIG. 1 through FIG. 4, a button module 8 in accordance with a first embodiment of the present disclosure includes an operating member 10, a circuit board 20, a button 30 and a light guiding component 40. The operating member 10 is a flake, in this embodiment, the operating member 10 has a shape like a circular flake. In some other embodiments, the operating member 10 could have other shapes, according to detailed needs for designs. The circuit board 20 has one or more patterns 22 adapted for detecting touch operations on the operating member 10. The patterns 22 may be made in a manner of manufacturing printed circuit board, or made in a manner of ITO, or triangle, shape like finger crossing, and so on formed by materials such as carbon nano-tube and other materials made in a manner of screen printing and the other methods, so the detailed embodiments are unlimited, just for achieving a function of detecting the touch. The button 30 is arranged on the circuit board 20. The light guiding component 40 includes a front side 44a, a back side 42a opposite to the front side 44a, a housing 46 defined between the front side 44a and the back side 42a, a recess 42b defined in the back side 42a for hosting a light source 7, a through hole 44b extending through the front side 44a and connecting the housing 46 to the external space, and an optical path 48 extending from an inner surface 42c of the recess 42b to the front side 44a. The light guiding component 40 may be made of any light guiding board materials which have a good light guiding performance. The recess 42b is adjustable according to the actual size of the light source. The operating member 10, the circuit board 20 and the button 30 are located in the housing 46 in sequence, the operating member 10 is at least partially hosted in the through hole 44b, and the button 30 abuts the light guiding component 40.

Figure 4:
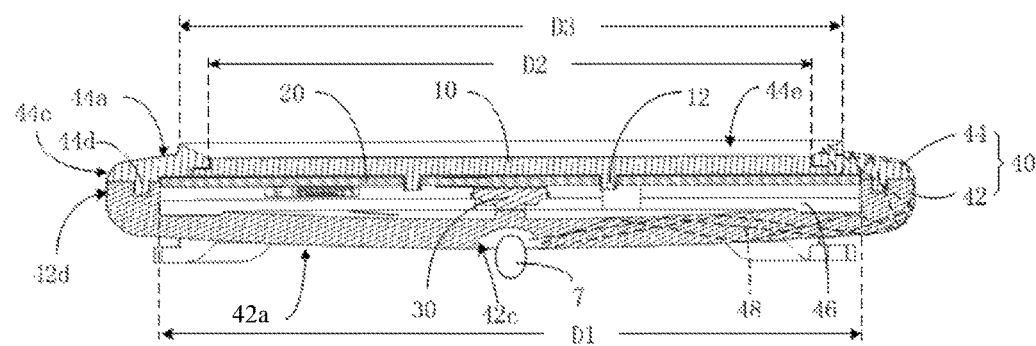
FIG. 4 is a cross section view of the button module in FIG. 1.

At operation, to achieve the function of the button, in response to a press on the operating member 10, the operating member 10 presses the button 30 via the circuit board 20, thereby achieving the function of pressing. The button 30 is preferably positioned at a center of the operating member 10, for making pressure towards the button 30 uniform as each part of a periphery of the operating member 10 being pressed. To achieve the function of the touch operation, a user does not have to press the operating member 10, and the user just needs to directly swipe on the operating member 10 along a desired track, the track is detected by the patterns 22 formed on the circuit board 20 which are adapted for detecting the touch, thereby achieving the function of the touch operation. When a light source, such as an LED lamp, is disposed in the recess 42b, at least a portion of the light is totally reflected in the light guiding component 40, thereby extending along the optical path 48 defined by the light guiding component 40, from the inner surface 42c of the recess 42b to the front side 44a, and exiting outwardly from the front side 44a. Thus, the button module 8 provided by this embodiment just requires one light source, and avoids using a number of the light sources. It should be noted that, the optical path 48 shown in the figure is a detailed and schematic view of the light, the actual optical path should be a cross section of the light guiding component 40 as shown in FIG. 4.

Specifically, the light guiding component 40 includes a light guiding base 42 and a light guiding cover 44. The light guiding base 42 substantially has a shape like a plate, a bottom of the light guiding base 42 includes the back side 42a and the recess 42b, and further includes a first interface (not labeled) back to the back side 42a and a side surface 42d interconnecting the back side 42a and the first interface. The light guiding cover 44 is substantially annular, and includes the front side 44a and the through hole 44b, and further includes a second interface (not labeled) back to the front side 44a and a side surface 44c interconnecting the front side 44a and the second interface. The first interface and the second interface combine with each other to form one interface, thereby forming the light guiding component 40 integrally. The optical path 48 extends through the two interfaces to the front side 44a and thus surrounds the housing 46.

Preferably, a first positioning structure is formed between the light guiding base 42 and the light guiding cover 44. In this embodiment, the first positioning structure includes a plurality of first concavities 42e defined in the light guiding base 42 and a plurality of first protruding poles 44d protruding outwardly from the second interface of the light guiding cover 44 and correspondingly received in the plurality of first concavities 42e. Similarly, preferably, a second positioning structure is formed between the operating member 10 and the circuit board 20. In this embodiment, the second positioning structure includes a plurality of second concavities 24 defined in the circuit board 20 and a plurality of second protruding poles 12 protruding outwardly from the operating member 10 and correspondingly received in the plurality of second concavities 24. It could be understood that, the concave and convex direction in the two positioning structures can also be opposite, or in other manners, as long as it has a positioning effect.

Preferably, the light guiding cover 44 defines a light emitting ring surface 44e located at the front side 44a and surrounding the through hole 44b. Reflective coatings are disposed on the front side 44a of the light guiding cover 44 and the side surface 44d except the light emitting ring surface 44e, and they are also disposed on the back side 42b of the light guiding base 42 and the side surface 42d except the inner surface 42c of the recess 42b. Thus, it effectively prevents light exiting from unintended surfaces, increases the brightness of the light emitting ring surface 44e. Preferably, a reflective coating is also disposed on an inner surface of the light guiding component 40 facing the housing 46. That is, the reflective coating is disposed on the light guiding component 40 except the light emitting ring surface 44e and an inner surface 42c of the recess 42b, thus further preventing light leaking.

Preferably, an interior diameter of the optical path 48 is greater than an interior diameter of the light emitting ring surface 44e. More preferably, an interior diameter of the optical path 48 is greater than an exterior diameter of the light emitting ring surface 44e. Specifically, as mentioned above, the optical path 48 is a cross section of the light guiding component 40 in FIG. 4, and has a certain width range. In this embodiment, the light guiding component 40 is circular, and a cross section of the optical path 48 has a shape like a ring relative to a plane vertical to a section plane in FIG. 4. Thus, the interior diameter of the optical path corresponds to a distance D1 in FIG. 4. The interior diameter of the light emitting ring surface 44e corresponds to a distance D2 in the figure, and the exterior diameter corresponds to a distance D3 in the figure. In such a situation that the interior diameter of the optical path 48 is greater than the interior diameter of the light emitting ring surface 44e, the optical path 48 would focus towards a center of the button module 8, which is beneficial to concentrate the light on the operating member 10. More preferably, the light emitting ring surface 44e is configured to converge towards the light guiding base 42, and this feature further increases the effect of light concentrating.

Figure 5:
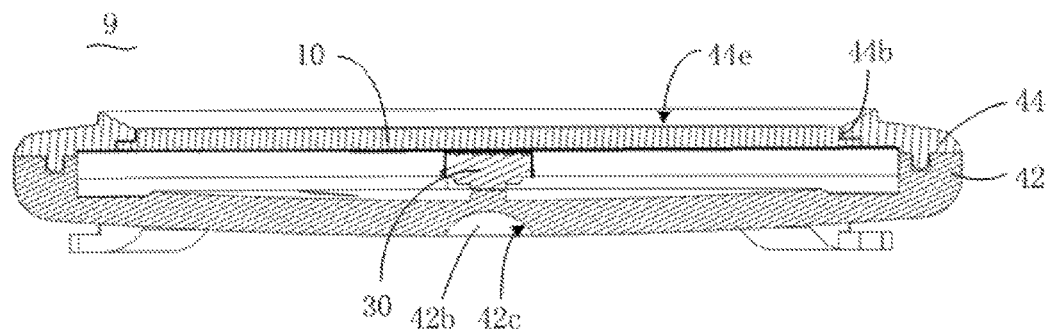
FIG. 5 is a schematic, cross section view of a button module in accordance with a second embodiment of the present disclosure.

FIG. 5 shows a schematic, cross section view of a button module 9 in accordance with a second embodiment of the present disclosure. The difference between the button module 9 and the button module 8 of the first embodiment is that it does not include a circuit board 20, and the button 30 abuts the operating member 10 and the light guiding base 42. In this situation, it could also achieve the function of the button and save the light sources. That is, the button module 9 of the second embodiment includes a light guiding base 42 which defines a recess 42b, a light guiding cover 44 opposite to the light guiding base 42 and defining a through hole 44b, a light emitting ring surface 44e surrounding the through hole 44b, an operating member 10 at least partially hosted in the through hole 44b, and a button 30 connecting to the operating member 10 and abutting the light guiding base 42. The light guiding base 42 and the light guiding cover 44 define an optical path 48 (as shown in FIG. 4) extending from an inner surface 42c of the recess 42b to the light emitting ring surface 44e, and an interior diameter D1 (as shown in FIG. 4) of the optical path 48 is greater than an exterior diameter D3 (as shown in FIG. 4) of the light emitting ring surface 44e. Preferably, the button 30 is a button-type rotary encoder. Thus, the rotary button 30 could achieve the function of detecting rotation by the touching patterns 22.

The above description is only optimal implementations of the present invention, not limiting the present invention, any modification, equivalent replacement and improvement, etc., within the spirits and principles of the present invention shall be included in the claimed scope of the present invention.

What is claimed is:
1. A button module, comprising:
   an operating member;
   a circuit board having a pattern for detecting touch operations on the operating member;
   a button arranged on the circuit board; and
   a light guiding component further including a front side, a back side opposite to the front side, a housing defined between the front side and the back side, a recess defined in the back side for hosting a light source, a through hole in the front side for connecting the housing to an external space, and an optical path extending from an inner surface of the recess to the front side;

wherein the operating member, the circuit board and the button are sequentially located in the housing, at least a portion of the operating member is exposed to the external space through the through hole, and the button abuts the light guiding component.

2. The button module as claimed in claim 1, wherein the light guiding component further comprises a light emitting ring surface located at the front side and surrounding the through hole, and a reflective coating is disposed on the light guiding component except the light emitting ring surface and the inner surface of the recess.

3. The button module as claimed in claim 1, wherein the light guiding component further comprises a light emitting ring surface located at the front side and surrounding the through hole, and a side surface connecting the front side to the back side, a reflective coating is disposed on the front side, the side surface, and the back side except the light emitting ring surface and the inner surface of the recess.

4. The button module as claimed in claim 1, wherein the light guiding component further comprises a light guiding base and a light guiding cover opposite to the light guiding base, the light guiding base comprises the back side and the recess, the light guiding cover comprises the front side and the through hole, with the optical path surrounding the housing.

5. The button module as claimed in claim 4, wherein a first positioning structure is formed between the light guiding base and the light guiding cover.

6. The button module as claimed in claim 4, wherein an interior diameter of the optical path is greater than an exterior diameter of the light emitting ring surface.

7. The button module as claimed in claim 6, wherein the light emitting ring surface converges towards the light guiding base.

8. The button module as claimed in claim 1, wherein a second positioning structure is formed between the operating member and the circuit board.

9. The button module as claimed in claim 1, wherein the button is located at a center of the operating member.

10. The button module as claimed in claim 1, wherein a light source is located in the recess and light from the light source propagates along the optical path extending from the inner surface of the recess to the front side of the light guiding component.

11. A button module, comprising:
a light guiding base defining a recess for hosting a light source;
a light guiding cover configured opposite to the light guiding base and having a through hole, the light guiding cover further including a light emitting ring surface surrounding the through hole;
an operating member located between the light guiding base and the light guiding cover, at least a portion of the operating member exposed to an external space through the through hole; and
a button connected to the operating member and abutting the light guiding base;
wherein the light guiding base and the light guiding cover define an optical path from an inner surface of the recess to the light emitting ring surface, and an interior diameter of the optical path is greater than an exterior diameter of the light emitting ring surface.

12. The button module as claimed in claim 11, wherein the button is directly disposed on the operating member.

13. The button module as claimed in claim 12, wherein the button is a button-type rotary encoder.

14. The button module as claimed in claim 11, wherein a first positioning structure is formed between the light guiding base and the light guiding cover.

15. The button module as claimed in claim 11, wherein a reflective coating is disposed on the light guiding base and the light guiding cover except the light emitting ring surface, the inner surface of the recess and an interface between the light guiding base and the light guiding cover.

16. The button module as claimed in claim 11, wherein the light guiding base and the light guiding cover define a housing and an interior surface surrounding the housing, a reflective coating is disposed on the light guiding base and the light guiding cover and the interior surface except the light emitting ring surface, the inner surface of the recess, and an interface between the light guiding base and the light guiding cover.

17. The button module as claimed in claim 16, wherein the button module further comprises a circuit board attached to the operating member and located in the housing, one side of the circuit board facing the operating member forms a pattern for detecting touch operations on the operating member, and the button is located at a center of an opposite side of the circuit board.

18. The button module as claimed in claim 17, wherein a second positioning structure is formed between the operating member and the circuit board.

19. The button module as claimed in claim 11, wherein the light emitting ring surface converges towards the light guiding base.

20. The button module as claimed in claim 11, wherein a light source is located in the recess and light from the light source propagates along the optical path extending from the inner surface of the recess to the light emitting ring surface surrounding the through hole.

* * * * *